UNITED STATES PATENT OFFICE.

CARL L. JENSEN, OF PHILADELPHIA, PENNSYLVANIA.

MANUFACTURE OF PEPSIN.

SPECIFICATION forming part of Letters Patent No. 286,138, dated October 2, 1883.

Application filed September 13, 1883. (No specimens.)

*To all whom it may concern:*

Be it known that I, CARL L. JENSEN, a citizen of the United States, and a resident of Philadelphia, Pennsylvania, have invented certain Improvements in the Manufacture of Pepsin, of which the following is a specification.

The object of my invention is to make concentrated pepsin having powerful digestive properties, and this object I attain in the manner hereinafter set forth.

The ordinary method of extracting pepsin from the stomachs of animals is as follows: The gastric glands of the stomach are first ruptured by mechanical means, and the broken textures are then steeped or washed in warm water, with or without acids or glycerine. The infusion is then drawn off and some precipitant added thereto, such as sugar of lead in the French process, or common table-salt in the process generally practiced in America. The addition of the precipitant causes the formation of a floculent mass containing the gastric ferments or pepsin in suspension, and after the separation of this matter from the solution, by straining or otherwise, it is added to many times its weight of starch or sugar of milk. Both of these preparations are in the form of fine powder and rapidly become musty or otherwise deteriorate on exposure. Moreover, a bulky dose of from fifteen to twenty grains, or more, of starch or sugar of milk must be taken into the stomach with each dose of pepsin, and the beneficial action of the latter is thus materially retarded or reduced.

In carrying out my invention I discard this plan and subject the tissues of the stomach to a gastric digestion—that is to say, to the influence of heat and acid—whereby an action similar to that in the natural stomach is set up. The tissues or textures of the stomach are dissolved by a peptic ferment, and a sirupy liquid or peptone is produced.

I prepare the pepsin as follows: The mucous membranes, or the whole stomachs, after being finely cut, are introduced into a capacious stone jar or vessel and mixed with about one-fifth of water, acidulated enough to possess the sourness of vinegar. The mixture is then brought up from 100° to 130° Fahrenheit, and under constant agitation the stomachs are converted into a peptone of a sirupy consistency, which, after clarifying and purifying by any of the well-known methods, is spread on glass plates for drying in a room heated up to about 115° Fahrenheit. It is then scraped off and the dry and brittle transparent flakes or scales are sifted through a sieve having about twenty linear threads to the inch, after which the product appears like minute crystals or scales.

Any vegetable or mineral acid may be employed, sulphuric or muriatic acid being preferred, and the quantity employed depending upon the condition of the stomachs under treatment, the rule being that the digestion shall be as nearly as possible like the natural action of the stomach.

The degree of heat may vary from blood-heat to about 130° Fahrenheit, and the operation will be facilitated by the addition of a small quantity of water, although this is not absolutely essential.

The pepsin thus produced is transparent, readily soluble in water without the use of acid, is practically tasteless and odorless, free from inert additions, and is capable of being permanently preserved. It further possesses enormous digestive power—from one to seven hundred—owing to the fact that not only have all of the completed digestive ferments been extracted from the stomach, but the latent peptic principle has by the method of treatment been developed or rendered active in the same manner as it would naturally have been in the stomach of a living animal.

I claim as my invention—

1. The mode herein described of obtaining pepsin, said mode consisting in subjecting animal stomachs to the action of heat and acid, whereby a gastric digestion takes place, and a peptone containing the digestive or gastric ferments is produced, separating the impurities from said peptone, and then evaporating it to dryness, as set forth.

2. As a new article of manufacture, the within-described pepsin in the form of hard scales or crystals, transparent, odorless, tasteless, capable of being permanently preserved, freely soluble in water without the use of acid, free from inert additions, and having a digestive power of one to seven hundred, substantially as set forth.

In testimony whereof I have signed my name to this specification in the presence of two subscribing witnesses.

CARL L. JENSEN.

Witnesses:
HARRY L. ASHENFELTER,
HUBERT HOWSON.